United States Patent [19]

Morikawa

[11] Patent Number: 5,054,444

[45] Date of Patent: Oct. 8, 1991

[54] FUEL INJECTION CONTROL SYSTEM FOR A TWO-CYCLE ENGINE

[75] Inventor: Koji Morikawa, Musashino, Japan

[73] Assignee: Fuji Jukogyo Kabushiki Kaisha, Tokyo, Japan

[21] Appl. No.: 390,209

[22] Filed: Aug. 4, 1989

[30] Foreign Application Priority Data

Aug. 11, 1988 [JP] Japan ................. 63-201439

[51] Int. Cl.$^5$ ............... F02D 41/34; F02M 67/02
[52] U.S. Cl. ................. 123/295; 123/73 C; 123/533
[58] Field of Search ............ 123/73 C, 478, 531, 123/533, 295, 305

[56] References Cited

U.S. PATENT DOCUMENTS

| | | | |
|---|---|---|---|
| 4,561,405 | 12/1985 | Simons | 123/492 X |
| 4,800,862 | 1/1989 | McKay et al. | 123/73 C X |
| 4,807,572 | 2/1989 | Schlunke | 123/73 C |
| 4,823,755 | 4/1989 | Hirose et al. | 123/73 C X |
| 4,949,689 | 8/1990 | Schlunke | 123/73 C X |

FOREIGN PATENT DOCUMENTS 57-203821 12/1982 Japan .
60-501963 11/1985 Japan .
62-113819 5/1987 Japan .

*Primary Examiner*—Tony M. Argenbright
*Attorney, Agent, or Firm*—Martin A. Farber

[57] ABSTRACT

A two-cycle engine has a fuel injector provided for injecting fuel directly in a cylinder of the engine. An amount of air actually induced into the cylinder is calculated based on the amount of escape air and the amount of intake air detected by an air-flow meter. The quantity of fuel injected by the fuel injector is calculated based on the engine speed and the amount of air induced in the cylinder. The timing of the fuel injection is advanced as engine load increases and the duration of fuel injection increases as the engine load and engine speed increase.

8 Claims, 5 Drawing Sheets

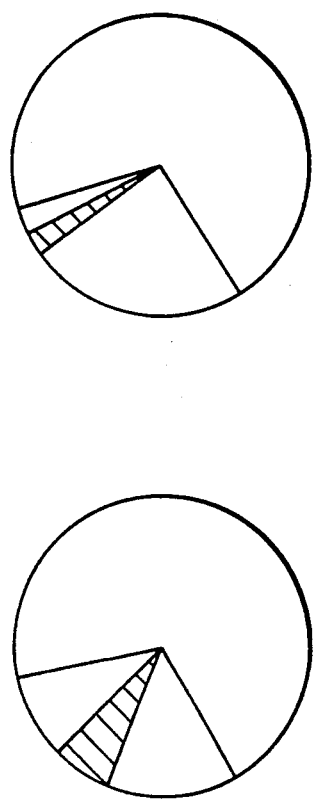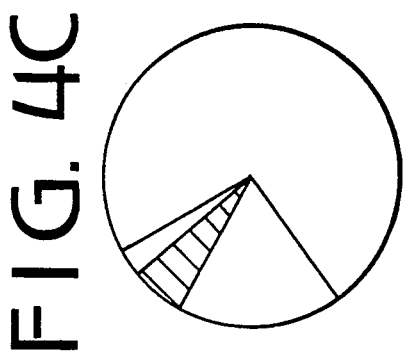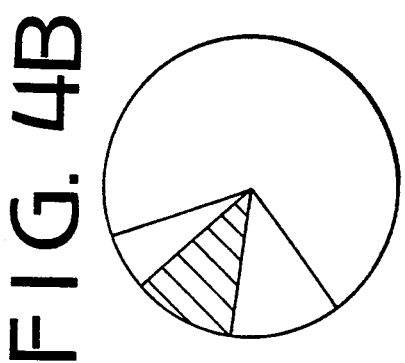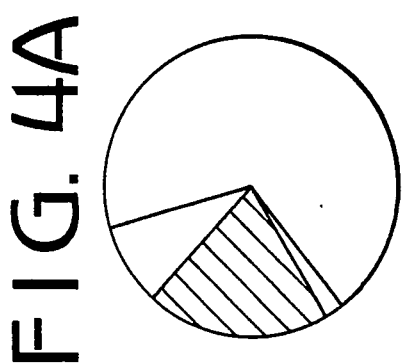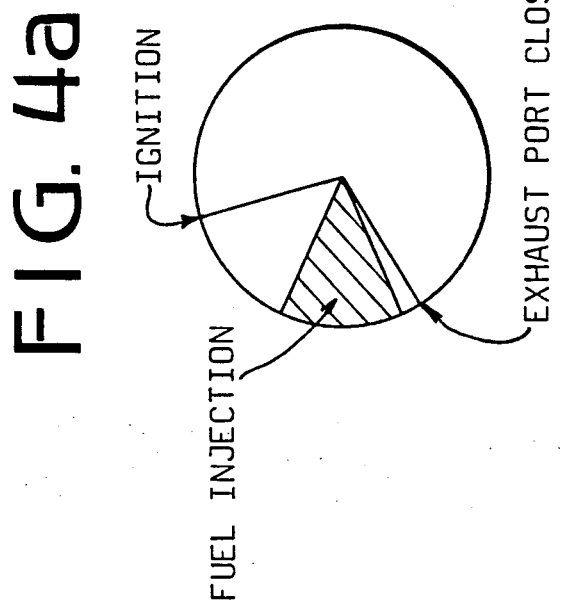

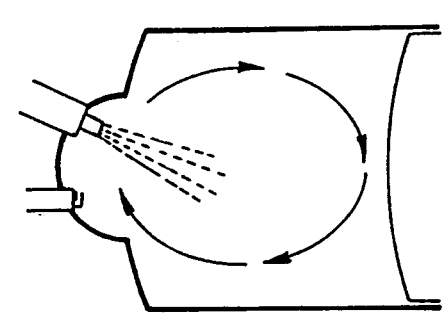
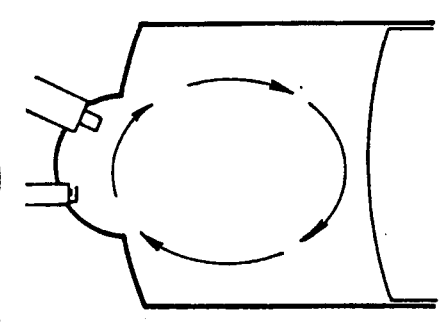
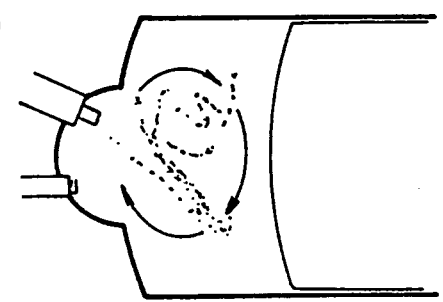
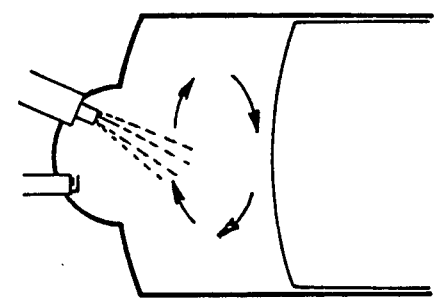
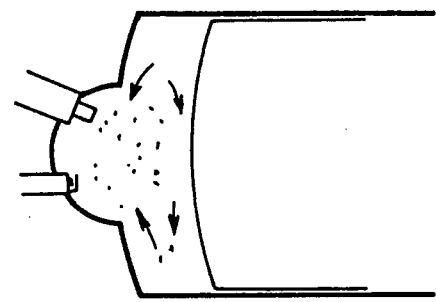
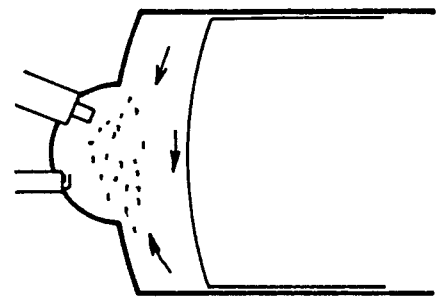

FUEL INJECTION CONTROL SYSTEM FOR A TWO-CYCLE ENGINE

BACKGROUND OF THE INVENTION

The present invention relates to a system for controlling the injection of fuel for a two-cycle engine with a direct fuel injection system, and more particularly to a system for controlling the injection timing in accordance with operating conditions of the engine.

There are various methods for supplying fuel to a two-cycle engine. In a method where fuel is mixed with air to make a combustible mixture and the mixture is supplied to a cylinder of the engine, a part of the fuel escapes from the cylinder through an exhaust port during the scavenging of the cylinder. In order to prevent fuel from escaping through the exhaust port, a method in which air alone is delivered to the cylinder and fuel is injected directly to the cylinder by an injector is proposed.

Japanese Patent Application Laid-Open 62-113819 discloses a two-cycle engine in which first and second scavenge passages are provided. The first scavenge passage is provided with a first throttle valve and a fuel injector to supply a combustible mixture to a cylinder of the engine. The second scavenge passage is provided for supplying air. The quantity of fuel is calculated in accordance with engine speed and a signal from an air-flow meter. The cylinder is scavenged by air, then supplied with the combustible mixture. In the system, fresh air must be quickly delivered from first and second scavenge passages to perform the scavenging. Accordingly, the structure of the control system becomes complicated. Thus, it is preferable to employ a direct fuel injection system for directly injecting fuel to the cylinder.

Japanese Patent Application Laid-Open Nos. 57-203821 and 60-501963 disclose direct fuel injection systems where each fuel injector is mounted in the cylinder of the engine. A quantity of fuel dependent on engine operating conditions is injected to form a combustible mixture in the cylinder.

In the direct fuel injection system, the fuel is injected after the exhaust port is closed in a compression stroke. Since the pressure in the cylinder changes during the compression stroke, the penetration, distribution and atomization of the fuel spray inevitably varies in dependency on the timing and duration of the fuel injection. Accordingly, it is preferable to change the time condition, in order to form a proper combustible mixture and to burn the mixture in accordance with engine operating conditions. For example, in a heavy engine load range, the duration of fuel injection is increased to produce large engine power. To the contrary, in a light engine load range, a stratified charge is preferable for burning a mixture without misfiring.

SUMMARY OF THE INVENTION

The object of the present invention is to provide a fuel injection control system for a two-cycle engine in which the timing and duration of fuel injection are controlled in accordance with engine operating conditions so as to improve the efficiency of the engine.

According to the present invention, there is provided a system for controlling the quantity of fuel for a two-cycle engine having at least one cylinder, a scavenge port, an exhaust port, an intake passage communicated with said scavenge port, and a fuel injector provided for injecting the fuel directly in the cylinder.

The system comprises detector means for detecting engine speed and load of the engine and for producing an operating condition signal, first calculator means responsive to the operating condition signal for calculating the amount of air actually induced into the cylinder, second calculator means for calculating a quantity of fuel injected by the fuel injector based on a desired air-fuel ratio and the amount of air induced in the cylinder, and determining means responsive to the operating condition signal for advancing the timing of the fuel injection with increasing engine load.

These and other objects and features of this invention will become understood from the following description with reference to the accompanying drawings.

BRIEF DESCRIPTION OF DRAWINGS

FIGS. 4a to 4c are diagrams showing fuel injection timings in a low engine speed range;

FIGS. 4A to 4C are diagrams showing fuel injection timings in a high engine speed range; and FIGS. 5a to 5c and 5A to 5C are schematic diagrams explaining the formation of the combustible mixture in a heavy engine load range and in a light engine load range, respectively.

DETAILED DESCRIPTION OF THE PREFERRED EMBODIMENT

Figure 1:
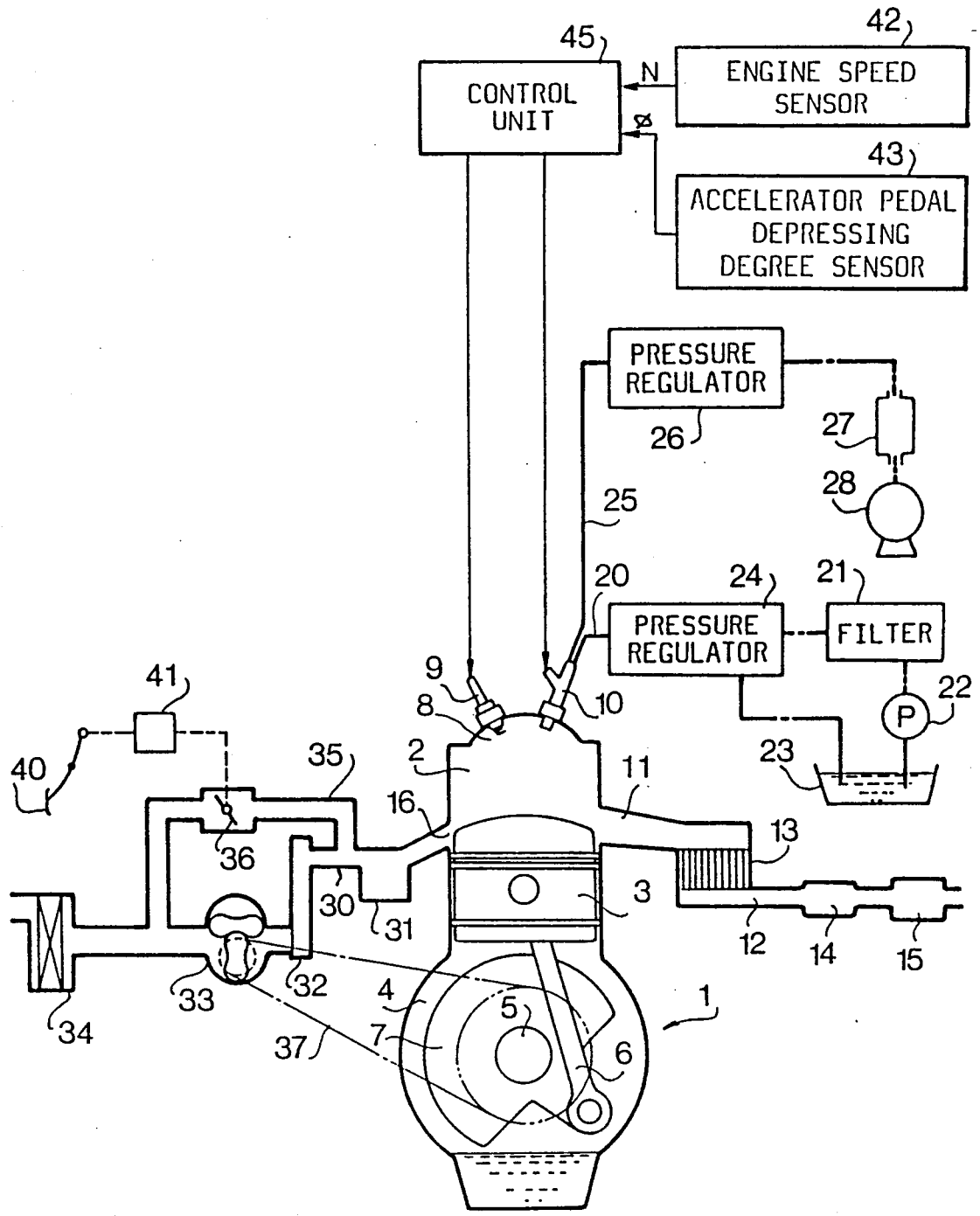
FIG. 1 is a schematic diagram of a two-cycle engine of the present invention.

Referring to FIG. 1, a two-cycle engine 1 comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to reduce the inertia of the piston 3 reciprocating in the cylinder 2.

In a wall of the cylinder 2, an exhaust port 11 and a scavenge port 16 are formed at 90 degrees angular disposition or opposing one another. The ports 11 and 16 are adapted to open at a predetermined timing with respect to the position of the piston 3.

A fuel injector 10 and a spark plug 9 are provided on a top of a combustion chamber 8 of the cylinder 2. The injector 10 is a type where a predetermined amount of fuel is injected together with air by compressed air in the form an air-fuel mixture. Fuel in a fuel tank 23 is supplied to the injector 10 through a fuel passage 20 having a filter 21, a pump 22 and a pressure regulator 24 for constantly maintaining the fuel at a predetermined low fuel pressure. The fuel is mixed with air supplied to the injector 10 by a compressor 28 passing through an air passage 25 having an accumulator 27 and a pressure regulator 26.

The engine 1 is supplied with air through an air cleaner 34, a displacement scavenge pump 33, an intercooler 32 for cooling scavenge air, and an intake pipe 30 having a scavenge chamber 31 for absorbing scavenge pressure waves when the scavenge port 16 is opened or closed. A bypass 35 is provided around the scavenge pump 33 and the intercooler 32. The bypass 35 is provided with a control valve 36. Exhaust gas of the engine 1 is discharged passing through the exhaust port 11, an exhaust pipe 12 having a catalytic converter 13, an exhaust chamber 14 and a muffler 15.

The scavenge pump 33 is operatively connected to the crankshaft 5 through a transmitting device 37 comprising an endless belt running over a crank pulley and a pump pulley. The scavenge pump 33 is driven by the crankshaft 5 through the transmitting device 37 for producing a scavenge pressure. An accelerator pedal 40 is operatively connected with the control valve 36 through a valve controller 41. The opening degree of the control valve 36 is controlled by the controller 41 so as to be inversely proportional to the depressing degree of the accelerator pedal 40. Further, an engine speed sensor 42 and an accelerator pedal depressing degree sensor 43 are provided for determining engine operating conditions.

Output signals from the sensors 42 and 43 are supplied to a control unit 45 which feeds an ignition signal, an air injection pulse signal and a fuel injection pulse signal to the spark plug 9 and the injector 10, respectively.

Figure 2:
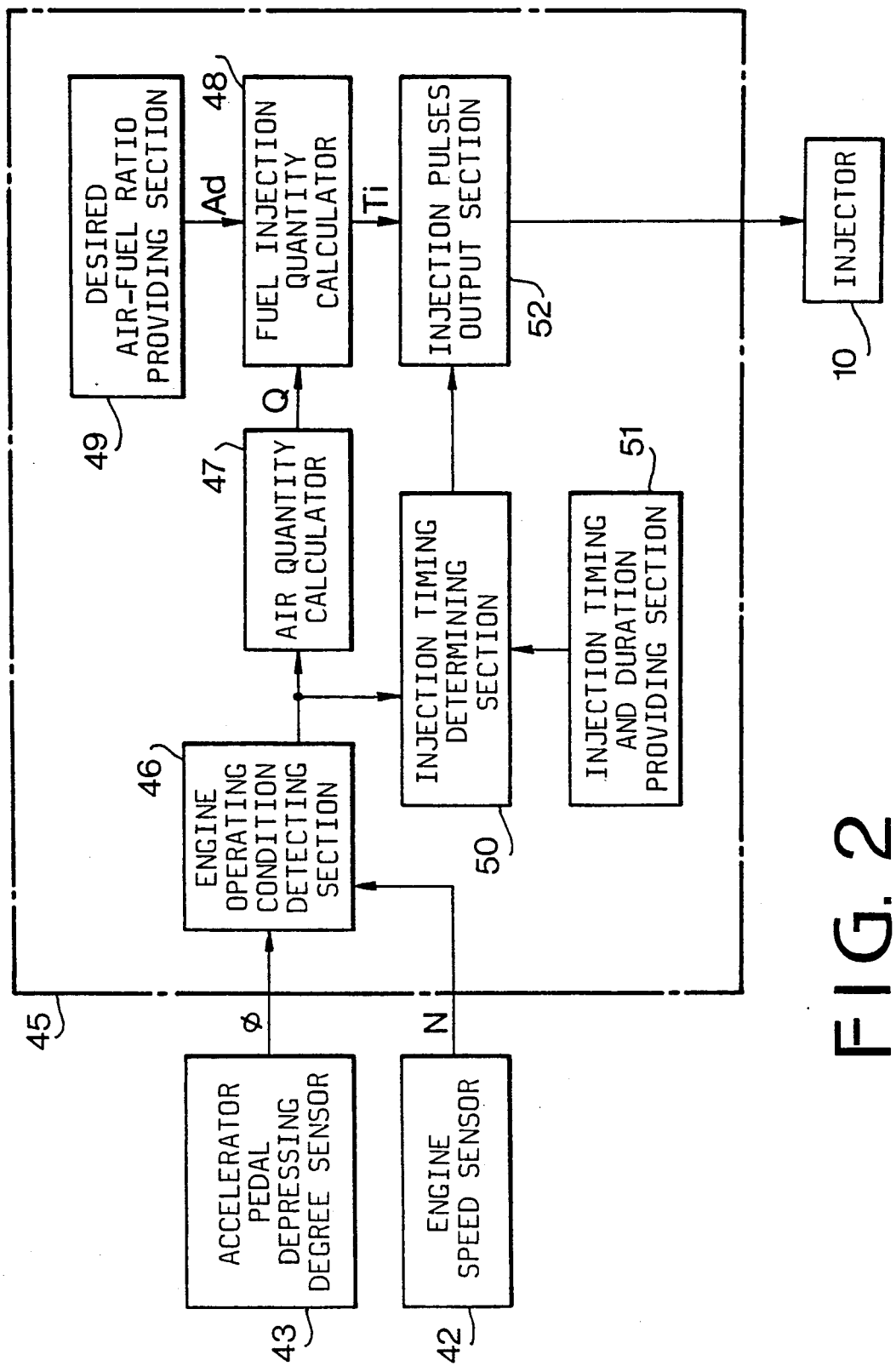
FIG. 2 is a block diagram showing a control unit according to the present invention.

Referring to FIG. 2, the control unit 45 comprises an engine operating condition detecting section 46 to which engine speed N and accelerator pedal depressing degree $\phi$ are applied. An output signal of the detecting section 46 is fed to an air quantity calculator 47 where air quantity Q in the cylinder 2 is calculated based on the engine speed N and accelerator pedal depressing degree $\phi$, while taking into account quantities of escape air at the scavenging and compressed air injected with fuel. The air quantity Q is fed to a fuel injection quantity calculator 48. In the fuel injection quantity calculator 48, a fuel injection quantity Ti is calculated from the equation, $$Ti = Q/Ad$$

where Ad is a desired air-fuel ratio (stoichiometry). The desired air-fuel ratios Ad are stored in a table in a desired air-fuel ratio providing section 49, arranged in accordance with the engine operating conditions.

The output signal of the engine operating condition detecting section 46 is further fed to an injection timing determining section 50 where timing and duration for injecting fuel are determined in dependency on a table provided in an injection timing and duration providing section 51.

Figure 3A:
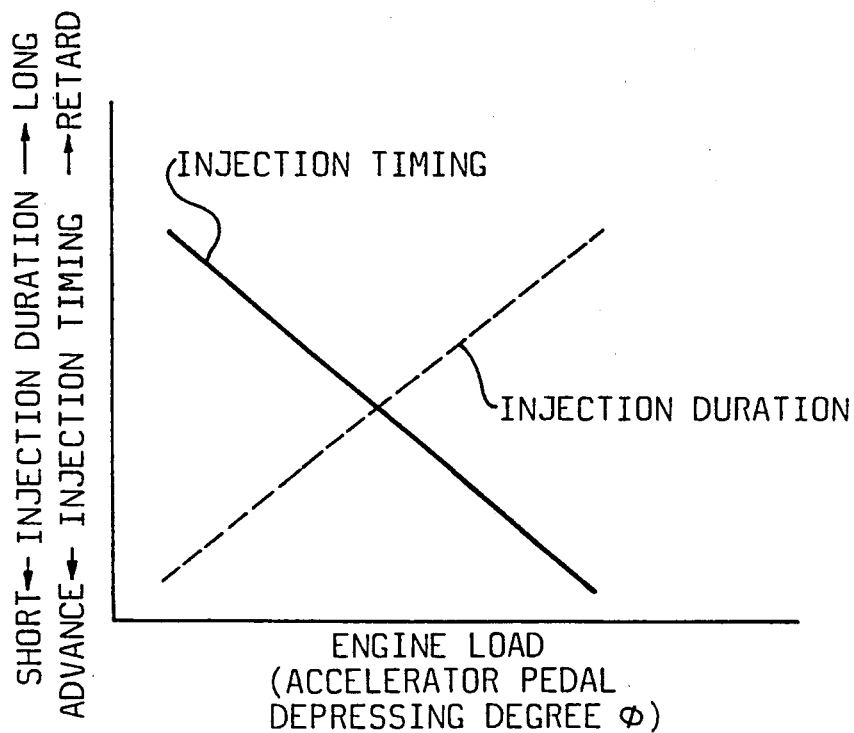
FIG. 3a is a graph showing fuel injection timing and duration with respect to accelerator pedal depressing degree and engine speed.
Figure 3B:
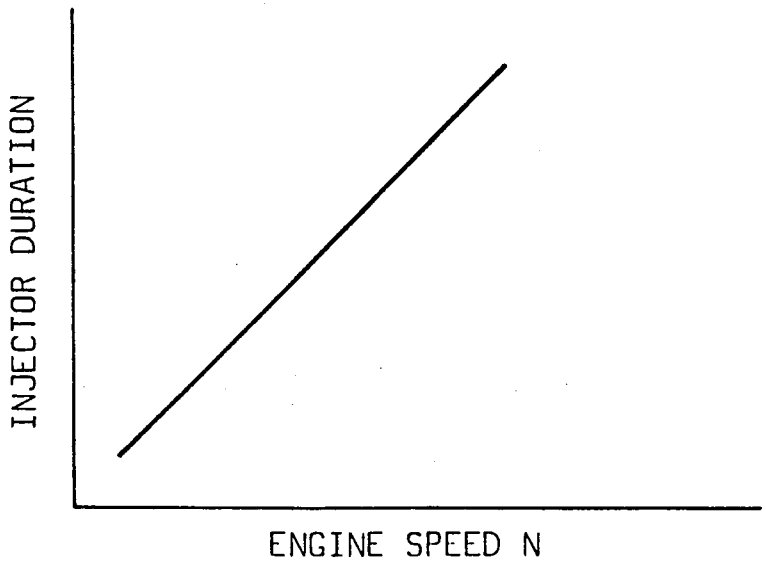
FIG. 3b is a graph showing fuel injection duration with respect to engine speed.

As shown by a solid line in FIG. 3a, the injection timing is advanced with increasing of engine load, that is, with increasing depressing degree $\phi$ of the accelerator pedal. The injection duration becomes longer as the engine load increases as shown by the dotted line. In addition, as shown in FIG. 3b, the duration of the fuel injection is determined as an increasing function of the engine speed N.

Output signals of the injection timing determining section 50 and the fuel injection quantity calculator 48 are fed to an injection pulses output section 52 where a fuel injection pulse width corresponding to the calculated fuel quantity Ti and an air injection pulse width corresponding to the injection duration are determined. The output section 52 applies a fuel injection pulse signal and an air injection pulse signal to the injector 10 to accumulate the calculated quantity of fuel therein and to inject the accumulated fuel at a determined timing and duration respectively.

The operation of the two-cycle engine is described hereinafter.

The air supplied from the scavenge pump 33 and cooled at the intercooler 32 is returned to the inlet side of the scavenge pump 33 through the bypass 35. Since the opening degree $\theta$ of the control valve 36 is controlled to be inversely proportional to the depressing degree $\phi$ of the accelerator pedal 40, when the depressing degree $\phi$ of the accelerator pedal is small, the control valve 36 is largely opened. As a result, a large amount of air is returned to the inlet side of the scavenge pump 33. Thus, a small amount of air, which corresponds to the small accelerator pedal depressing degree, flows into the cylinder 2 for scavenging without causing pumping loss. As the depressing degree $\phi$ increases, the quantity of fresh air forced into the cylinder 2 increases with the closing of the control valve 36.

When the piston 3 reaches a position close to the bottom dead center as shown in FIG. 1, the scavenge port 16 opens as well as the exhaust port 11 so that intake air, the quantity of which depends on the position of the accelerator pedal 40, is delivered by the scavenge pump 33 into the cylinder 2 through the intercooler 32 and the scavenge port 16. Consequently, burned gas in the cylinder 2 is scavenged so that fresh intake air is admitted therein in a short time. During the compression stroke, the piston 3 rises, closing both ports 11 and 16. A dose of fuel accumulated in the injector 10 in accordance with the fuel injection pulse signal from the control unit 45 is injected by the compressed air, which is supplied in accordance with the air injection pulse signal, as the air-fuel mixture. The mixture is swirling in the combustion chamber with the scavenging air and ignited by the spark plug 9 immediately before the top dead center. After the explosion, the piston 3 descends for the power stroke. Accordingly, the exhaust port 11 is opened so that burned gas in the cylinder 2 which is still under high pressure escapes. The piston 3 further descends, thereby returning to the afore-described intake stroke where cylinder 2 is scavenged.

In the control unit 45, the engine speed N and the accelerator pedal depressing degree $\phi$ detected by the sensors 42 and 43, respectively, are fed to the engine operating condition detecting section 46 to detect the engine operating conditions. The air quantity Q and the desired air-fuel ratio Ad which are obtained in accordance with the engine operating conditions in the air quantity calculator 47 and the desired air-fuel ratio providing section 49, respectively, are applied to the fuel injection quantity calculator 48 so that the fuel injection quantity Ti dependent on the engine operating conditions is calculated in accordance with the afore-described equation. A fuel injection pulse width signal representing the quantity Ti is fed to the injector 10 through the injection pulse output section 52 so that a quantity of fuel corresponding to the quantity Ti is accumulated in the injector 10.

Referring to FIG. 4a, in a heavy engine load range when the engine speed is low, a large quantity of fuel is injected for a long period of 45° for instance, starting immediately after the closing of the exhaust port, for example, 90° to 110° before top dead center (BTDC). As shown in FIG. 5a, since the fuel is injected while the pressure in the cylinder is still low, the fuel is widely distributed as a result of a sufficient penetration of the fuel spray. The fuel is further mixed with air during the compression stroke to produce a homogeneous mixture. Consequently, the combustible mixture is properly burned effectively using a large quantity of air to generate large engine power.

On the other hand, in a light engine load range, the fuel injection, the duration of which is 5° for instance, is retarded as much as possible, for example 45° BTDC, as shown in FIG. 4c. Thus, a small quantity of fuel is injected after an increase of the pressure in the cylinder so that a rich fuel mixture stays in an upper portion of the cylinder because of the small penetration of the fuel spray (FIGS. 5A to 5C). Consequently, the charge stratification is achieved so that the fuel in the upper portion of the cylinder 2 is ignited with the spark plug 9 without misfiring. Particularly in the light engine load range, it is preferable to adjust the injection timing so that the injection ends immediately, or about 10°, before the ignition which is 30° BTDC at a low engine speed.

As shown in FIG. 4b, in a middle engine load range, the fuel is injected between the timings shown in FIGS. 4a and 4c. The air-fuel mixture is partly stratified as a result of the low penetration of the spray.

FIGS. 4A to 4C show fuel injection timings at a high engine speed in heavy, middle and light engine load ranges, respectively, The fuel injection period becomes longer than in the low engine speed range so that the start of the injection is advanced.

From the foregoing, it will be understood that the present invention provides a fuel injection control system for a two-cycle engine where the timing and duration of the fuel injection is controlled in accordance with engine operating conditions. Accordingly, a stratified charge is obtained in a light engine load range for stably burning the combustible mixture. On the other hand, fuel is sufficiently mixed with air in a heavy engine load range to produce a large engine power. Furthermore, combustion efficiency is improved at every engine operating condition so as to improve fuel consumption and emission control.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling quantity of fuel for a two-cycle engine having at least one cylinder, a scavenge port, an exhaust port, an intake passage communicated with said scavenge port, a fuel injector provided for injecting the fuel directly in the cylinder, the system comprising:
   detector means for detecting engine speed and load on the engine and for producing an operating condition signal;
   first calculator means responsive to the operating condition signal for calculating an amount of air actually induced into the cylinder;
   second calculator means for calculating a quantity of fuel injected by the fuel injector based on a desired air-fuel ratio and the amount of air induced in the cylinder; and
   determining means responsive to the operating condition signal for advancing timing and increasing duration of fuel injection with increasing engine load.

2. The system according to claim 1 wherein:
   the determining means is provided for further increasing duration of the fuel injection with increasing engine speed.

3. The system according to claim 1, wherein:
   the detector means comprises
   an engine speed sensor, and
   a sensor for detecting depression degree of an accelerator pedal for the engine.

4. A system for controlling quantity of fuel for a two-cycle engine having at least one cylinder, a scavenge port, an exhaust port, an intake passage communicated with the scavenge port, a fuel injector provided for injecting air-fuel mixture directly into the cylinder, the system comprising:
   detector means for detecting engine speed and load on the engine and for producing an operating condition signal;
   first calculator means responsive to the operating condition signal for calculating an amount of air actually induced into the cylinder;
   second calculator means for calculating a fuel injection quantity based on a desired air-fuel ratio and the amount of air induced in the cylinder;
   determining means responsive to the operation condition signal for determining timing and duration of fuel injection, said timing being advanced with increasing engine load, said duration representing an increasing function with increase of the engine load and the engine speed; and
   output means for outputting a first signal to the injector for accumulating fuel of the fuel injection quantity in the injector and for outputting a second signal to the injector for injecting with air the fuel accumulated in the injector at the timing and for the duration determined by the determining means.

5. The system according to claim 4, wherein
   the intake passage includes an intake pipe directly connected to the scavenge port, a scavenge pump disposed in the intake pipe to force air supply to the scavenge port, a bypass provided around the scavenge pump to return air from downstream of the scavenge pump to upstream of the scavenge pump, and a control valve disposed in the bypass to control quantity of returned air.

6. The system according to claim 4, wherein:
   the detector means comprises
   an engine speed sensor, and
   sensor for detecting depression degree of an accelerator pedal for the engine.

7. A fuel injection control system for a two-cycle engine having at least one cylinder, a scavenge port and an exhaust port provided in a wall of said cylinder, an intake passage communicating with said scavenge port, an accelerator pedal operatively connected to a throttle valve for controlling an amount of air induced into said cylinder via said scavenge port, a fuel injector for injecting air-fuel mixture directly into said cylinder, an engine speed sensor for detecting engine speed and for generating a corresponding engine speed signal, and an accelerator pedal depressing degree sensor for detecting a depressing degree of said accelerator pedal and for producing a corresponding engine load signal, the improvement in the control system which comprises:
   engine operating condition detecting means responsive to said engine speed and engine load signals for determining an engine operating condition and for producing an engine operating condition signal;

air quantity calculating means responsive to said engine operating condition signal for calculating said amount of air corresponding to each said operating condition and for producing an air quantity signal;

fuel injection timing and duration time means responsive to said engine operating condition signal for determining timing and duration time of fuel injection so as to advance said timing with increasing engine load and to increase said duration time of fuel injection as an increasing function of said engine load an said engine speed and for producing a fuel injection signal;

fuel injection quantity calculating means responsive to said air quantity signal for calculating a fuel injection quantity based on a desired air-fuel ratio and said amount of air induced into said cylinder and for producing a fuel injection quantity signal; and an injection pulse generator responsive to said fuel injection signal and said fuel injection quantity signal for determining an injection pulse to actuate said injector in order to inject an optimum amount of air and fuel mixture at an optimum timing for a desired duration time so as to form a stratified charge in said cylinder in a light load range.

8. The system according to claim 7, further comprising a desired air-fuel ratio providing section for providing said desired air-fuel ratio in accordance with said engine operating condition.

* * * * *